United States Patent [19]

Madlener et al.

[11] Patent Number: 5,355,589
[45] Date of Patent: Oct. 18, 1994

[54] SENSING HEAD FOR THE THREE-DIMENSIONAL SENSING OF WORKPIECE

[76] Inventors: Wolfgang Madlener, Koenigberger Strasse 20; Wilfried Veil, Ludwig-Uhland-Strasse 3, both of 7980 Ravensburg, Fed. Rep. of Germany

[21] Appl. No.: 68,195

[22] Filed: May 28, 1993

[30] Foreign Application Priority Data

May 28, 1992 [DE] Fed. Rep. of Germany ....... 4217641

[51] Int. Cl.⁵ .................................................. G01B 5/03
[52] U.S. Cl. ........................................ 33/561; 33/559; 33/556
[58] Field of Search ................ 33/556, 557, 558, 559, 33/560, 561, 563

[56] References Cited

U.S. PATENT DOCUMENTS

| 3,250,012 | 5/1966 | Hilton et al. |
| 4,352,246 | 10/1982 | Hauert ........................... 33/559 |

FOREIGN PATENT DOCUMENTS

| 0022598 | 1/1981 | European Pat. Off. . |
| 0103089 | 3/1984 | European Pat. Off. . |
| 2259091 | 6/1974 | Fed. Rep. of Germany . |
| 2458082 | 7/1975 | Fed. Rep. of Germany . |
| 3234470 | 3/1984 | Fed. Rep. of Germany ........ 33/556 |
| 0124902 | 7/1983 | Japan ..................................... 33/559 |
| 1490433 | 6/1989 | U.S.S.R. . |
| 2062234 | 5/1981 | United Kingdom . |
| 1593050 | 7/1981 | United Kingdom . |
| 2238616 | 6/1991 | United Kingdom ................ 33/561 |

*Primary Examiner*—William A. Cuchlinski, Jr.
*Assistant Examiner*—Alvin Wirthlin
*Attorney, Agent, or Firm*—Spencer, Frank & Schneider

[57] ABSTRACT

A sensing head for a three-dimensional sensing of a workpiece includes a housing; a lid secured to the housing at one end thereof; a transmission member axially slidably received in the housing; a transducer mounted in the housing and cooperating with the transmission member for generating a signal representing axial displacements of the transmission member; a spring disposed in the housing and urging the transmission member toward the lid; and a bearing body disposed in the housing between the lid and the transmission member. The bearing body is a spherical segment having a base and a spherical surface. The base is in contact with an inner face of the lid. A sensing pin secured to the bearing body passes through the lid. The transmission member has a circular edge constituting a seat being in a circular contact with the spherical surface and centering the bearing body in the housing. The sensing pin and the bearing body are pivotally displaceable about a contact location between the inner lid face and a boundary edge between the base and the spherical segment. Any pivotal motion of the bearing body relative to the inner lid face causes an axial motion of the transmission body relative to the lid.

1 Claim, 1 Drawing Sheet

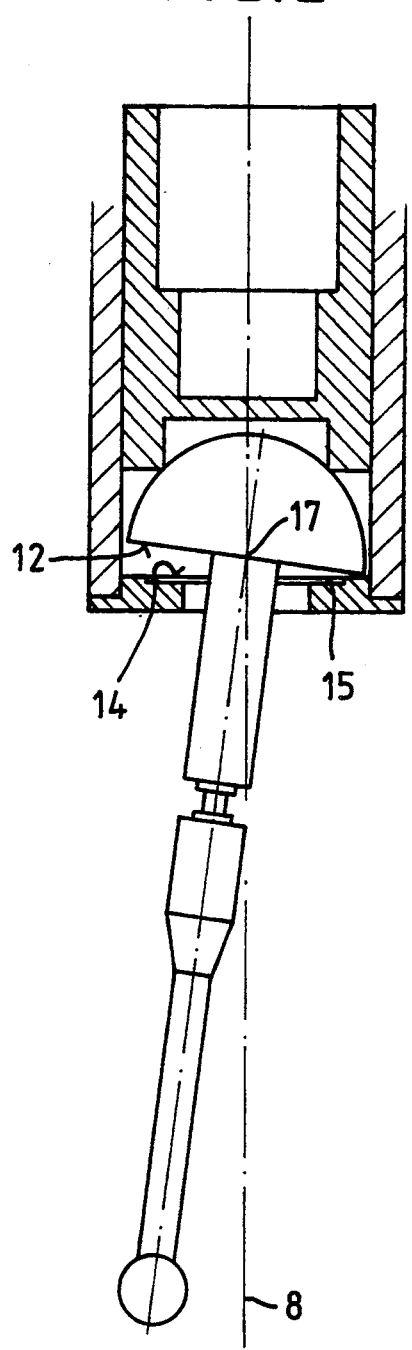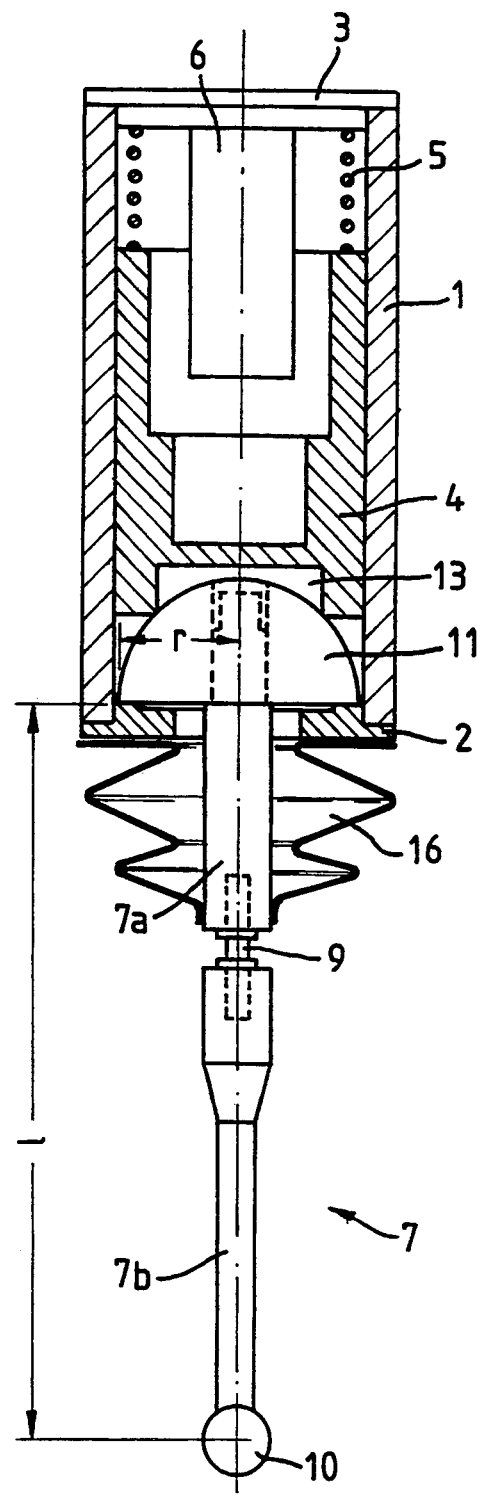

SENSING HEAD FOR THE THREE-DIMENSIONAL SENSING OF WORKPIECE

BACKGROUND OF THE INVENTION

The invention relates to a sensing head for the three-dimensional sensing of workpieces. The sensing head includes an essentially cylindrical housing, a transmission member, which is mounted movably therein in the axial direction and interacts with a primary element. A sensing pin which projects from the housing is seated against a bearing body shaped as a spherical segment. The transmission member is moved by pivoting the sensing pin about the spherical center-point and by the thus-effected inclination of the flat surface. Sensing heads of this kind are used in measuring machines or, mounted instead of a tool onto the tool carrier, in numerically controlled machine tools for the creation of measured values. In this case, the primary element which is used can have a purely switching function or a function measuring the linear path of the transmission member. It is a matter, in any event, of transforming the deflection motion of the sensing pin with maximum accuracy into a linear motion of the transmission member.

A typical example of a sensing head of the type defined in the introduction is described in U.S. Pat. No. 3,250,012. In this, the sensing pin is attached to the spherical side of the bearing body. The bearing body is received, with its spherical shape, by an annular step bearing, which is a component part of the housing and is passed through by the sensing pin. With the flat side, more precisely with the annular rim of the surface, the bearing body bears against the flat, radial front face of a displaceable sleeve serving as a transmission member. The sleeve is acted upon by a spring which thus, on the one side, holds the bearing body in its step bearing and, as a result of the mutual bearing contact of the two flat surfaces, returns the sensing pin into its rest position coaxial to the longitudinal axis of the housing.

SUMMARY OF THE INVENTION

The object of the invention is to increase the measuring accuracy of a sensing head of this type, whilst maintaining its basic outer dimensions.

This object is achieved by the invention, according to which the sensing head for a three-dimensional sensing of a workpiece includes a housing; a lid secured to the housing at one end thereof; a transmission member axially slidably received in the housing; a transducer mounted in the housing and cooperating with the transmission member for generating a signal representing axial displacements of the transmission member; a spring disposed in the housing and urging the transmission member toward the lid; and a bearing body disposed in the housing between the lid and the transmission member. The bearing body is a spherical segment having a base and a spherical surface. The base is in contact with an inner face of the lid. A sensing pin secured to the bearing body passes through the lid. The transmission member has a circular edge constituting a seat being in a circular contact with the spherical surface and centering the bearing body in the housing. The sensing pin and the bearing body are pivotally displaceable about a contact location between the inner lid face and a boundary edge between the base and the spherical segment. Any pivotal motion of the bearing body relative to the inner lid face causes an axial motion of the transmission body relative to the lid.

Critical to the accuracy to be achieved is the reduction ratio by which the transverse motion of the preferably spherical end of the sensing pin is transformed into a longitudinal motion of the transmission member. This reduction ratio is determined, on the one hand, according to the length of the sensing pin between the center-point of the spherical shape of the bearing body and the spherical center-point at the end of the sensing pin and, on the other hand, according to the diameter of the flat surface of the bearing body. If, as proposed, the bearing body is now rotated by 180° in relation to the known sensing head, then its spherical center-point and hence the pivot of the sensing pin is transposed in the direction of the front face of the housing and the reduction-effective length of the sensing pin thereby shortened, although the sensing pin protrudes equally far out of the housing. Whilst the externally recognizable length of the sensing pin and the diameter of the housing remain unchanged, the reduction ratio and hence the measuring accuracy are thus considerably improved.

BRIEF DESCRIPTION OF THE DRAWINGS

FIG. 1 shows a longitudinal section of a sensing head in the rest state in diagrammatic representation and FIG. 2 shows a partial reproduction of this sensing head, the sensing pin being laterally deflected.

DESCRIPTION OF THE PREFERRED EMBODIMENT

The represented sensing head comprises a cylindrical housing 1 having a lid 2 and a base 3. Fitted displaceably inside is a sleeve 4 acting as a transmission member. A spring 5, which is supported against the base 3, forces the sleeve 4 downwards. Fastened to the base 3 is a symbolically shown primary element (transducer) 6 which detects the longitudinal position of the sleeve 4 in relation to the housing 1 and transmits this as an electrical signal.

The lid 2 has a central opening through which a sensing pin 7 protrudes outwards. In its rest position according to FIG. 1, the axis of this sensing pin 7 coincides with the housing axis 8. The sensing pin comprises two parts 7a and 7b, which are interconnected by a pin 9 forming a predetermined breaking point in the event of overloading. The outer part 7b supports at the end, as usual, a ruby sensing sphere 10. The end of the inner part 7a of the sensing pin is firmly connected to a hemisphere (single-base spherical segment) 11 serving as a bearing body, to be more precise, in such a way that the sensing pin juts out from the flat surface (base) 12 of the hemisphere. The sensing pin axis passes through the spherical center-point and is oriented perpendicularly to the surface 12.

The sleeve 4, on the front face facing the hemisphere, has a central bore 13 having a chamfered edge; this bearing arrangement (seat) receives the hemisphere 11 on its spherical side and centers it in relation to the housing axis 8. The surface 12 of the hemisphere bears on the other side against the inwardly facing surface 14 of the lid 2. The outer annular region of this flat surface is particularly accurately worked, whilst the other surface region exhibits, up to the opening, a flat recess 15 for the reception of possible dirt particles. The opening in the lid 2 is covered, moreover, by a bellows 16, which comes to bear, on the other side, against the inner part 7a of the sensing pin.

FIG. 2 illustrates the pivotal deflection motion of the sensing pin 7 in its lateral contact with a workpiece. Thus, the sensing pin 7 and the hemisphere 11 pivot as a unit about a location of contact between the rim of the flat surface 12 of the hemisphere 11 and the surface 14 of the lid 2. During such pivotal motion the spherical center-point moves upwards a little on the housing axis 8. The sleeve 4 is also forced upwards, in equal measure, by the hemisphere 11, this motion being detected by measuring techniques or circuitry. In minor deflections, the path which the sensing sphere 10 covers in the case of deflection at right-angles to the housing axis 8 relates to the corresponding axial path of the sleeve 4 as the sensing pin length 1 relates to the sphere radius r. This dimensional ratio is smaller and hence more favorable to the achievable measuring accuracy than in the known installation of the hemisphere with opposite orientation, since in this case the spherical center-point from which the length 1 must be calculated is situated further within the housing interior.

The systematic advantage of the invention is obtained in all sensing heads of the generic type, regardless of the other constructional details. The circular sphere seat, by means of a bore having a chamfered edge, produces a smooth motion and is therefore particularly expedient. In place of the slide runner of the sleeve 4 in the housing 1, a sphere guide can advantageously be used. The external shape of the housing 1 is chosen according to the purpose of application, possibly even deviating from the cylindrical form. Moreover, the advantage of the invention makes itself felt in all constructions of the primary element, even if the bearing body or sensing pin is provided with a device which prevents it from being twisted in relation to its longitudinal axis.

We claim:

1. A sensing head for a three-dimensional sensing of a workpiece, comprising (a) a housing having an inner space, a longitudinal axis and opposite ends;
(b) a lid secured to the housing at one end thereof; the lid having an opening and an inner face oriented toward said inner space;
(c) a transmission member axially slidably received in said inner space for motion toward or away from the lid;
(d) a transducer mounted in the housing and cooperating with the transmission member for generating a signal representing axial displacements of the transmission member;
(e) a spring disposed in the housing and urging said transmission member toward said lid;
(f) a bearing body disposed in said inner space of said housing between said lid and said transmission member, said bearing body being a spherical segment having a base and a spherical surface; said base being in contact with said inner face of said lid;
(g) a sensing pin secured to said bearing body and extending away from said bearing body from said base; said sensing pin being perpendicular to said base and passing through said opening of said lid; and
(h) a seat defined in said transmission member; said seat including a circular edge being in a circular contact with said spherical surface; said seat centering said bearing body in said housing; said sensing pin and said bearing body being pivotally displaceable about a contact location between said inner face of said lid and a boundary edge between said base and said spherical segment; any pivotal motion of said bearing body relative to said inner face of said lid causes a sliding motion between said spherical surface and said circular edge and an axial motion of said transmission body relative to said lid.

* * * * *